(12) United States Patent
Kagimoto et al.

(10) Patent No.: US 8,320,917 B2
(45) Date of Patent: Nov. 27, 2012

(54) MOBILE TERMINAL, COMMUNICATION SYSTEM INCLUDING COMMUNICATION SERVER BASE STATION, COMMUNICATION METHOD IN THE COMMUNICATION SYSTEM AND BASE STATION

(75) Inventors: Tomonari Kagimoto, Fukuoka (JP); Yohji Fukuzawa, Fukuoka (JP); Akihiro Sato, Fukuoka (JP); Tatsuhiko Takata, Fukuoka (JP); Kazunori Umezaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 12/813,112

(22) Filed: Jun. 10, 2010

(65) Prior Publication Data
US 2010/0248726 A1    Sep. 30, 2010

Related U.S. Application Data

(63) Continuation of application No. PCT/JP2007/075106, filed on Dec. 27, 2007.

(51) Int. Cl.
*H04W 36/00*    (2009.01)

(52) U.S. Cl. ......... 455/436; 455/437; 455/438; 455/442

(58) Field of Classification Search .......... 455/436–438, 455/442
See application file for complete search history.

(56) References Cited

U.S. PATENT DOCUMENTS

| | | | |
|---|---|---|---|
| 6,347,091 B1 | 2/2002 | Wallentin et al. | |
| 6,728,217 B1 * | 4/2004 | Amirijoo et al. | 370/252 |
| 7,733,830 B2 * | 6/2010 | Curcio et al. | 370/333 |
| 2003/0092392 A1 * | 5/2003 | Komandur et al. | 455/67.1 |
| 2004/0027997 A1 | 2/2004 | Terry et al. | |
| 2005/0143098 A1 * | 6/2005 | Maillard | 455/456.5 |

FOREIGN PATENT DOCUMENTS

| | | |
|---|---|---|
| JP | 2000316185 | 11/2000 |
| JP | 2002518958 | 6/2002 |
| JP | 2006187019 | 7/2006 |
| WO | 9966748 | 12/1999 |

OTHER PUBLICATIONS

International Preliminary Report on Patentability and Written Opinion of the International Searching Authority issued in PCT/JP2007/075106 dated Jul. 29, 2010.
International Search Report dated Mar. 18, 2008 in corresponding International application No. PCT/JP2007/075106.

* cited by examiner

*Primary Examiner* — Marisol Figueroa
(74) *Attorney, Agent, or Firm* — Murphy & King, P.C.

(57) ABSTRACT

A communication method in a communication system, wherein the communication system includes a mobile terminal, a communication server that distributes data to the mobile terminal, and plural base stations that are capable of relaying the data, and one of the base stations among the plural base stations is responsible for relaying the data. The communication method includes transmitting, to the communication server, restriction instruction information to restrict a data transmission rate, by a first base station that is responsible for relaying the data among the plural base stations, and handovering, by the first base station, causing a second base station different from the first base station to take over the responsibility of relaying.

9 Claims, 18 Drawing Sheets

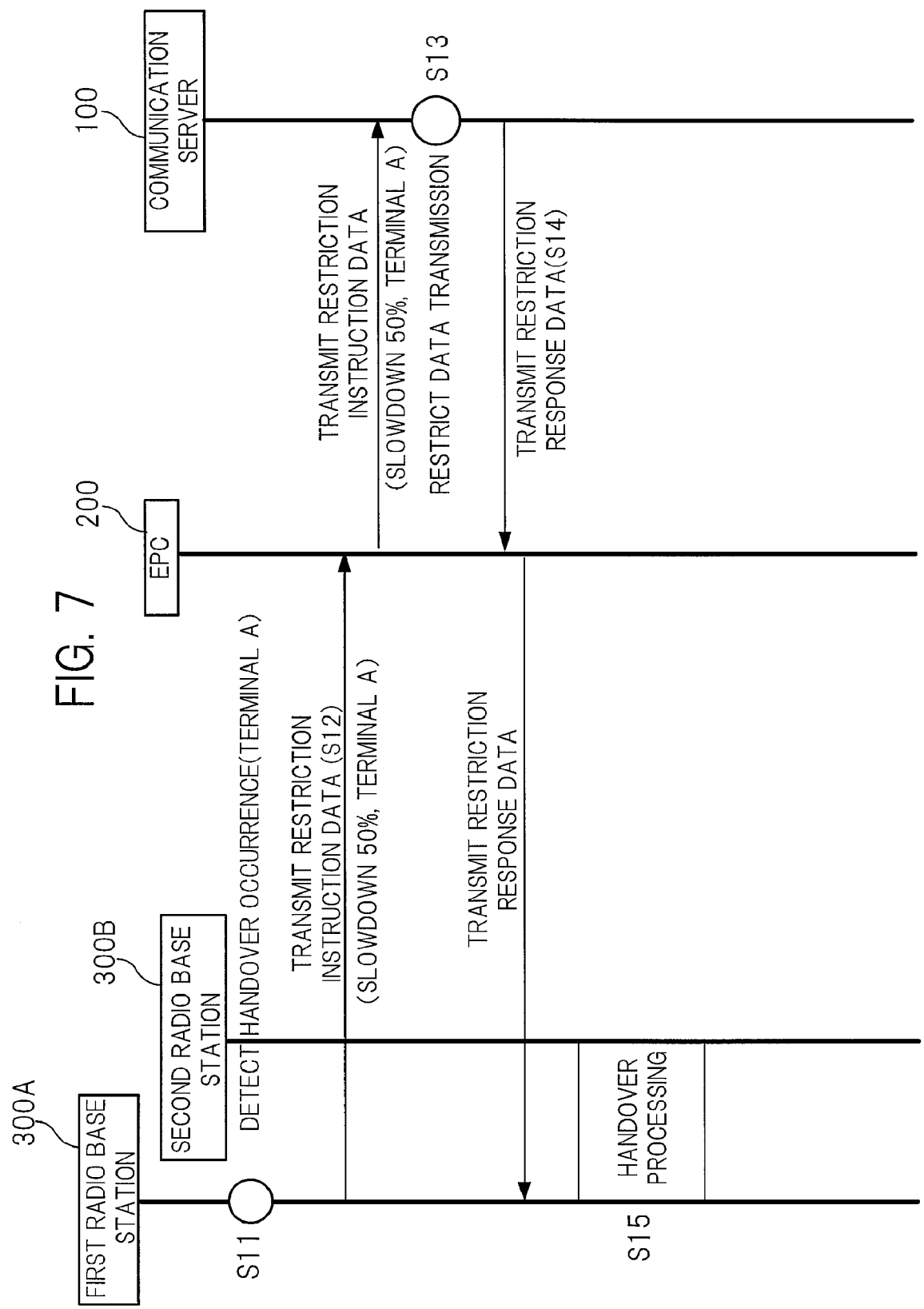

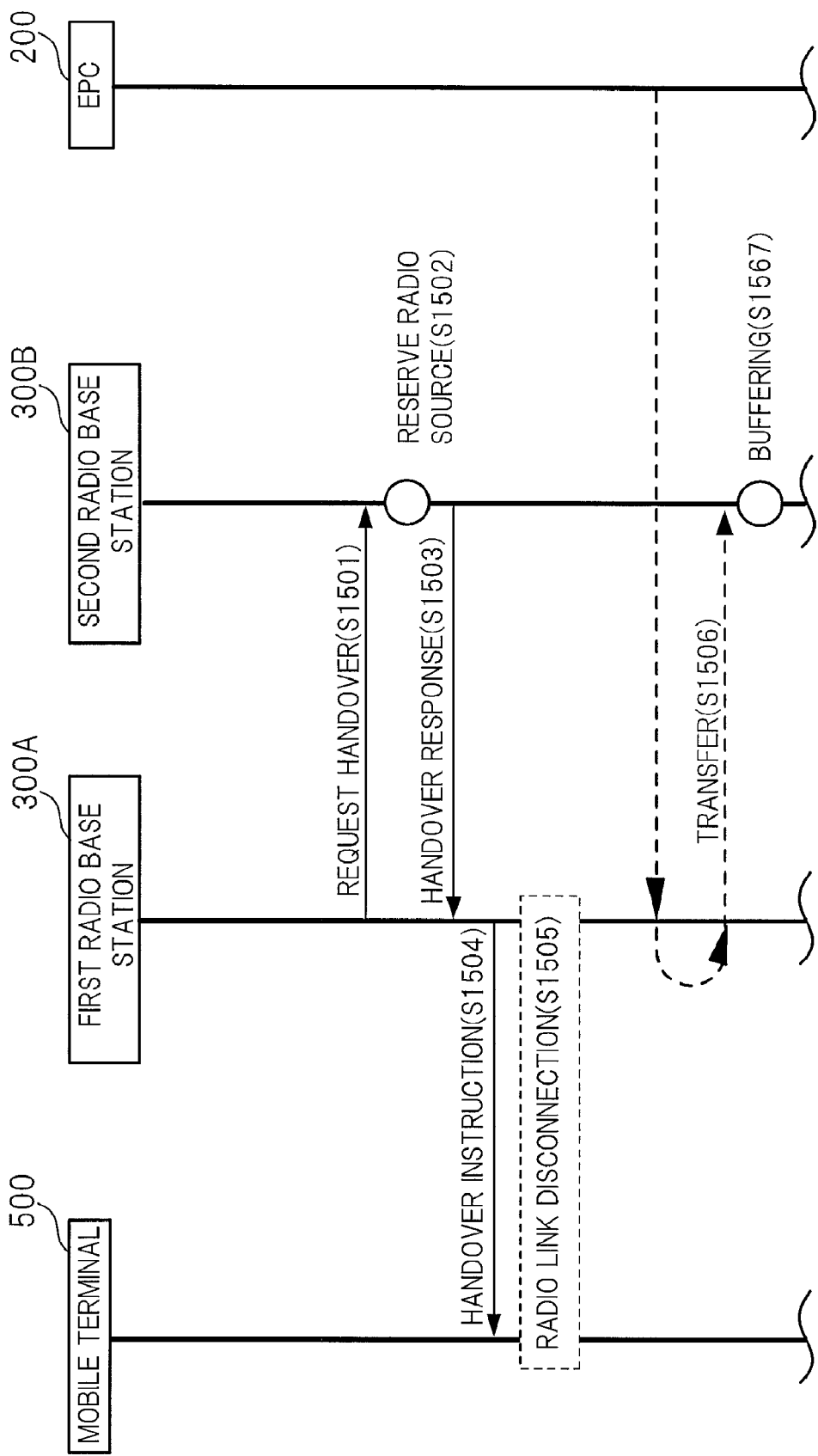

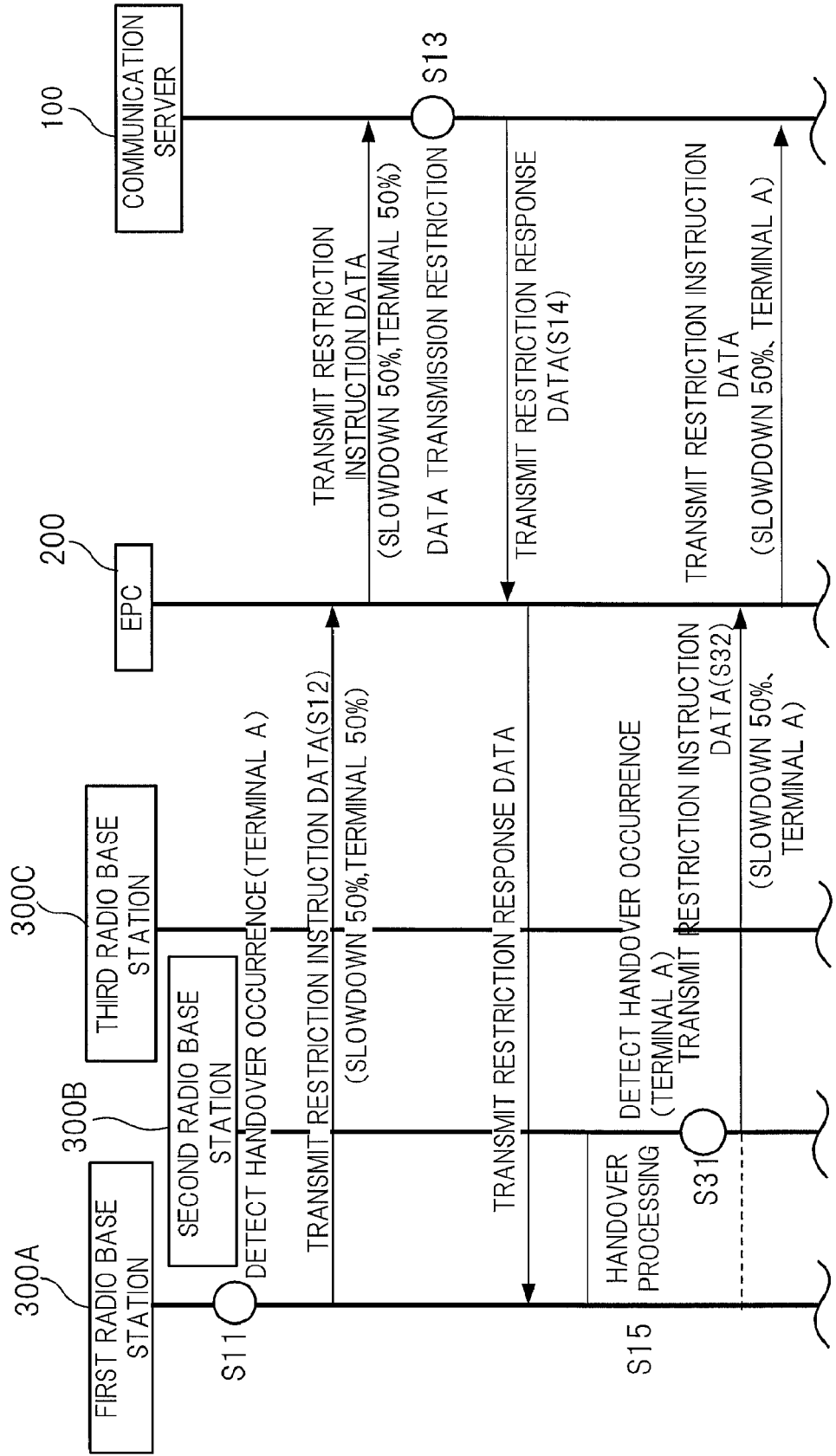

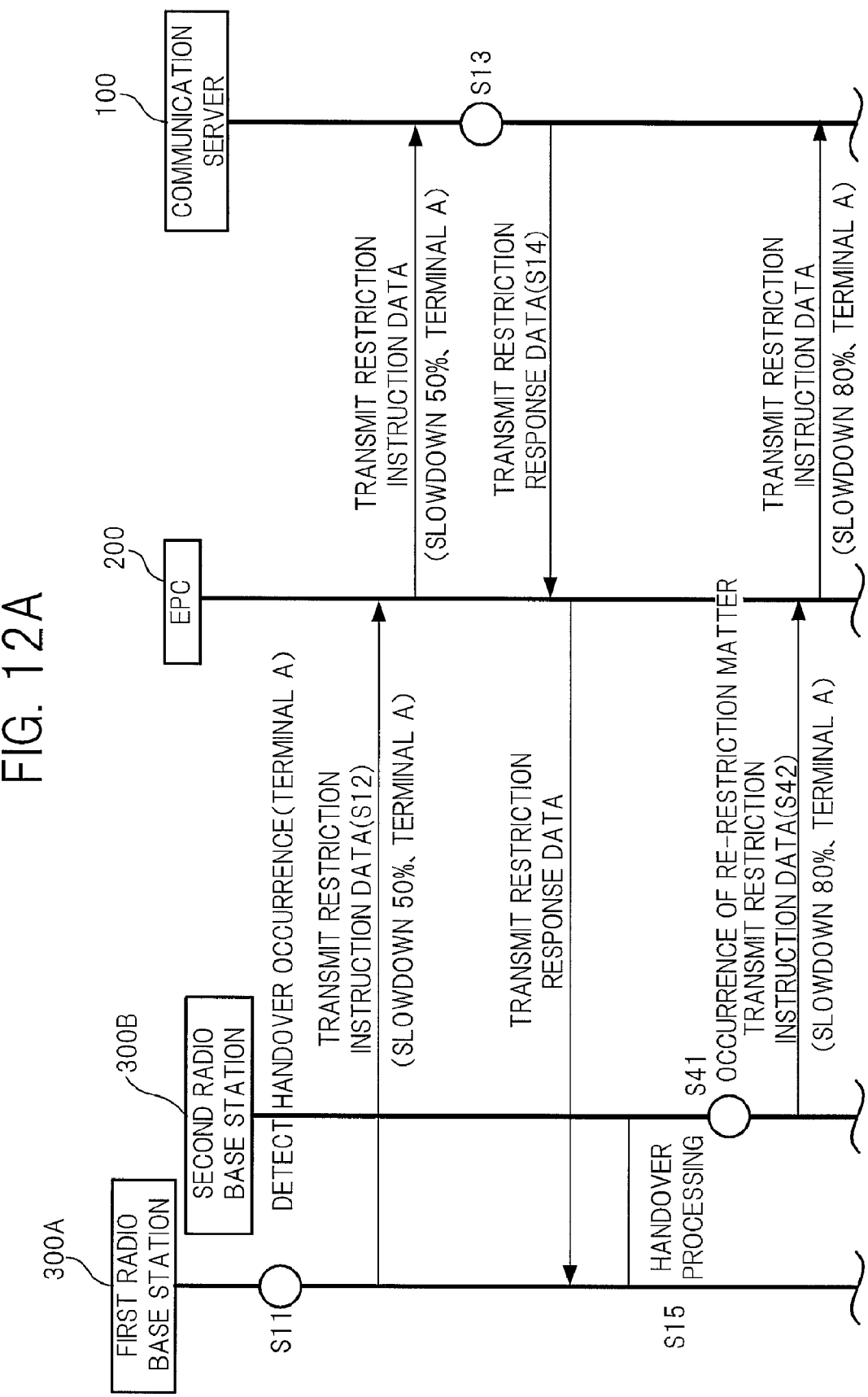

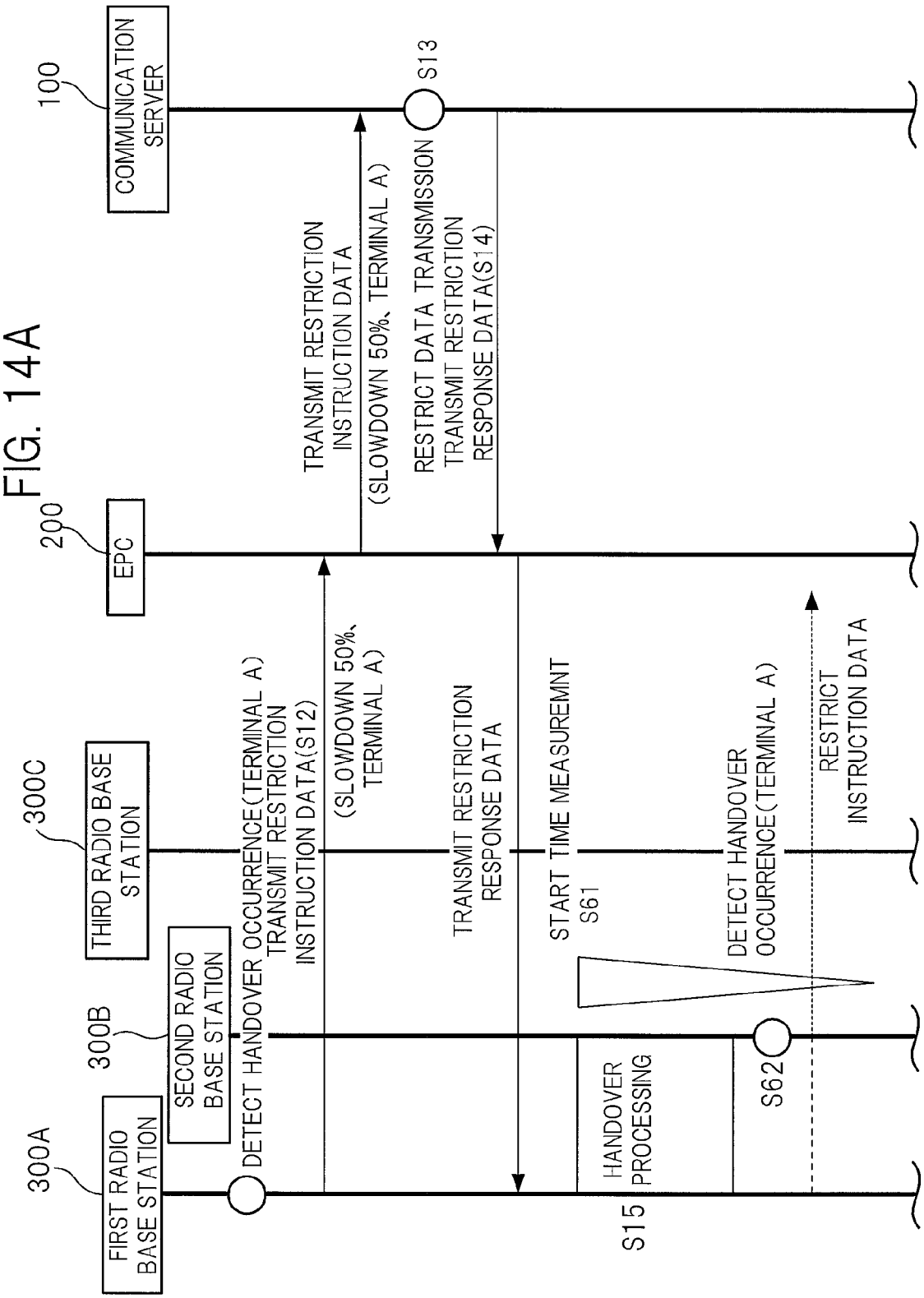

US 8,320,917 B2

MOBILE TERMINAL, COMMUNICATION SYSTEM INCLUDING COMMUNICATION SERVER BASE STATION, COMMUNICATION METHOD IN THE COMMUNICATION SYSTEM AND BASE STATION

CROSS-REFERENCE TO RELATED APPLICATION

This is a continuation application of PCT/JP2007/075106, filed on Dec. 27, 2007.

FIELD

The embodiments discussed herein are directed to a communication method, a communication system and a base station.

BACKGROUND

As a high-speed mobile communication standard at an intermediate stage between the third generation (3G) and the fourth generation (4G) in the mobile communication system, the development of Long Term Evolution (hereafter, abbreviated as "LTE") is pursued. Although the LTE is positioned as an evolution system of IMT-2000 which is a standard of the third generation, the radio interface and RAN (Radio Access Network) architecture of the LTE are drastically reviewed from a view point of smooth shift to 4G, and thus they are largely different from those of the 3G system. In the LTE radio network, with the reduction of delay time and the improvement of communication rate, a data transmission rate of a maximum rate of 300 Mbit/s for downlink and a maximum rate of 50 Mbit/s for uplink is realized.

In contrast to the 3 G communication system where during communication, plural communication links are established for one mobile terminal at one time, the number of link established in the LTE communication system is one. That is, in the LTE communication system, when a mobile terminal moves across cells and a handover takes place, the mobile terminal needs to terminate a connection once with a cell of origin for moving and establish a connection with a cell of destination for moving.

FIG. 1 through FIG. 3 are block diagrams to explain a handover in the LTE communication system.

A LTE communication system 90 illustrated in FIG. 1 through FIG. 3 includes a mobile terminal 95, a communication server 91 to distribute data to the mobile terminal 95, base stations 93a and 93b called as evolved NodeB (eNB) to transmit data by radio from the communication server 91 to the mobile terminal 95, and a gateway device 92 called as Evolved Packet Core (EPC) to distribute the data transmitted from the communication server 91 into either of the base stations 93a and 93b. Additionally, the communication server 91 may be another terminal that is a communication counterpart of the mobile terminal 95. Each of the base stations 93a and 93b communicates with the mobile terminal 95 located in three cells "A" (94a), "B" (94b) and "C" (94c) for which the respective base stations 93a, 93b are responsible. In a state illustrated in FIG. 1, the mobile terminal 95 located in the cell 94b communicates with the base station 93a, and data is transmitted to the mobile terminal 95 via the gateway device 92 and the base station 93a. When the mobile terminal 95 moves from the cell "B" 94b to another cell "C" 94c and a handover takes place, as illustrated in FIG. 2, the base station 93a terminates the connection with the mobile terminal 95, and then as illustrated in FIG. 3, the base station 93b establishes a connection with the mobile terminal 95. In this way, in the LTE communication system 90, an instantaneous interruption occurs between the disconnection and the establishment of connection.

To avoid data loss by the instantaneous interruption, in a radio base station device, it is desired to take measures such as buffering data in a buffer until when a handover is completed in a cell of destination for moving and transmitting the data buffered in the radio base station to the mobile terminal after completing connection of user in the cell of destination for moving. For example, as a technology of temporarily buffering data to be distributed to a mobile terminal, Japanese Laid-open Patent Publication No. 2006-187019 and Japanese National Publication of International Patent Application No. 2002-518958 present communication systems that buffer data transmitted from RNC (radio network controller) in NodeB (radio base station) in the third generation communication network.

A storage capacity required to buffer the data transmitted increases with an increase of a transmission rate of data. Since a downlink communication rate reaches as fast as 300 Mbps in the LTE, it is desired to provide a buffer memory of large-capacity. For instance, if a handover control takes 0.5 second, a buffer memory of approximately 19 MByte is desired per one user, and accommodating 100 users produces a necessity of implementing as much as 2 GByte of buffer memory for the handover. In this way, every time the number of users accommodated in a radio base station increases, a buffer memory for controlling the handover is required, thus increasing a system cost. If the amount of buffering is limited to avoid an increase of cost, a loss of downlink data occurs and may sacrifice the quality of communications.

Here, in the system of Japanese Laid-open Patent Publication No. 2006-187019, the amount of data to be transmitted from the RNC is controlled, thereby restricting the amount of data in NodeB (radio base station). For example, the NodeB or an UE (mobile terminal) monitors the radio quality, and if the radio quality is deteriorated, reduces the amount of data to be caused to flow to the NodeB from the RNC, thereby reducing the amount of data to be buffered in the NodeB. Although the data flow between the RNC and the NodeB is optimized in the system of Japanese Laid-open Patent Publication No. 2006-187019 and the amount of buffering in the NodeB may be reduced, buffering in a higher-level node is desired.

Also, in the system of Japanese National Publication of International Patent Application No. 2002-518958, the amount of data stored in a buffer memory is measured or predicted, and if there is a possibility of an occurrence of buffer overflow, "back pressure" (restriction of transmission) is performed to the higher-level node, thereby restricting the buffer overflow. With this, although the amount of communications in a router may be reduced, similarly to the system of Japanese Laid-open Patent Publication No. 2006-187019, buffering in a higher-level node or another node is desired.

SUMMARY

According to a first aspect of the invention, a communication method is the communication method in a communication system, wherein the communication system includes:
  a mobile terminal;
  a communication server that distributes data to the mobile terminal; and
  plural base stations that are capable of relaying the data, and one of the base stations among the plural base stations is responsible for relaying the data, and
  the communication method comprises:

transmitting, to the communication server, restriction instruction information to restrict a data transmission rate, by a first base station that is responsible for relaying the data among the plural base stations; and hand-overing, by the first base station, causing a second base station different from the first base station to take over the responsibility of relaying.

According to a second aspect of the invention, a base station is the base station in a communication system which includes a mobile terminal and a communication server that distributes data to the mobile terminal, the base station being responsible for relaying the data, wherein the base station comprises:

a relay control section that, after transmitting restriction instruction information to restrict a data transmission rate to the communication server, causes another base station different from the base station to take over the responsibility of relaying.

According to a third aspect of the invention, a communication system includes:

a mobile terminal;

a communication server that distributes data to the mobile terminal;

plural base stations that are capable of relaying the data, and one of the base stations among the plural base stations is responsible for relaying the data; and a relay control section that, after transmitting restriction instruction information to restrict a data transmission rate to the communication server, causes another base station different from the one base station to take over the responsibility of relaying.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating processes at the time of handover in the communication system illustrated in FIG. 4;

FIGS. 8A, 8B are flowcharts illustrating details of the handover step illustrated in FIG. 7;

FIGS. 11A, 11B are flowcharts illustrating processes at the time of consecutive handovers;

FIGS. 12A, 12B are flowcharts illustrating processes accompanying a re-restriction;

FIGS. 14A, 14B are flowcharts illustrating processes when the responsibility of relaying in a communication system in a third embodiment moves from one base station to another.

DESCRIPTION OF EMBODIMENTS

Hereafter, with reference to drawings, embodiments will be explained for the communication method, the communication system, and the base station whose aspects are explained above.

Figure 1:
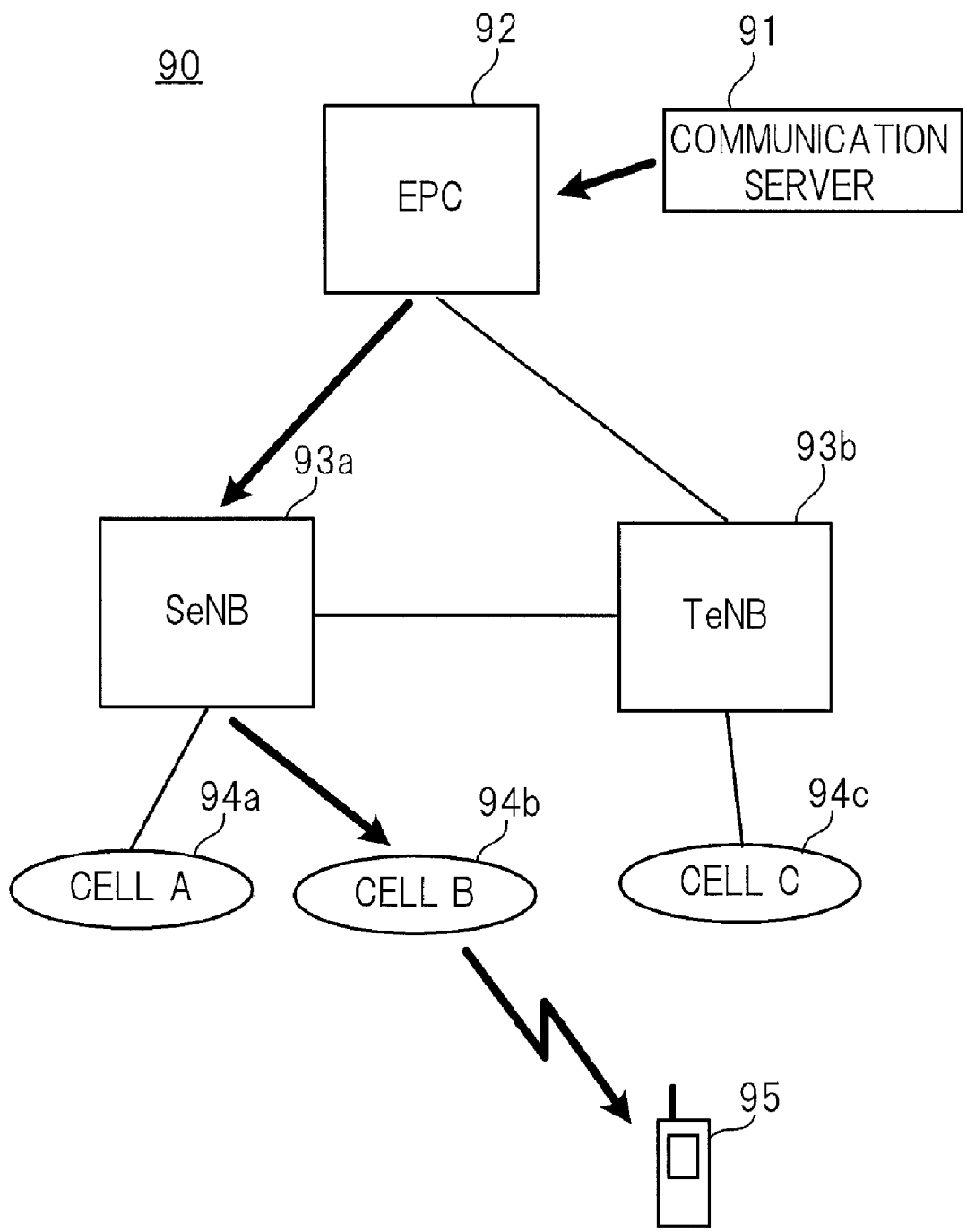
FIG. 1 is a block diagram to explain a handover in a LTE communication system.
Figure 2:
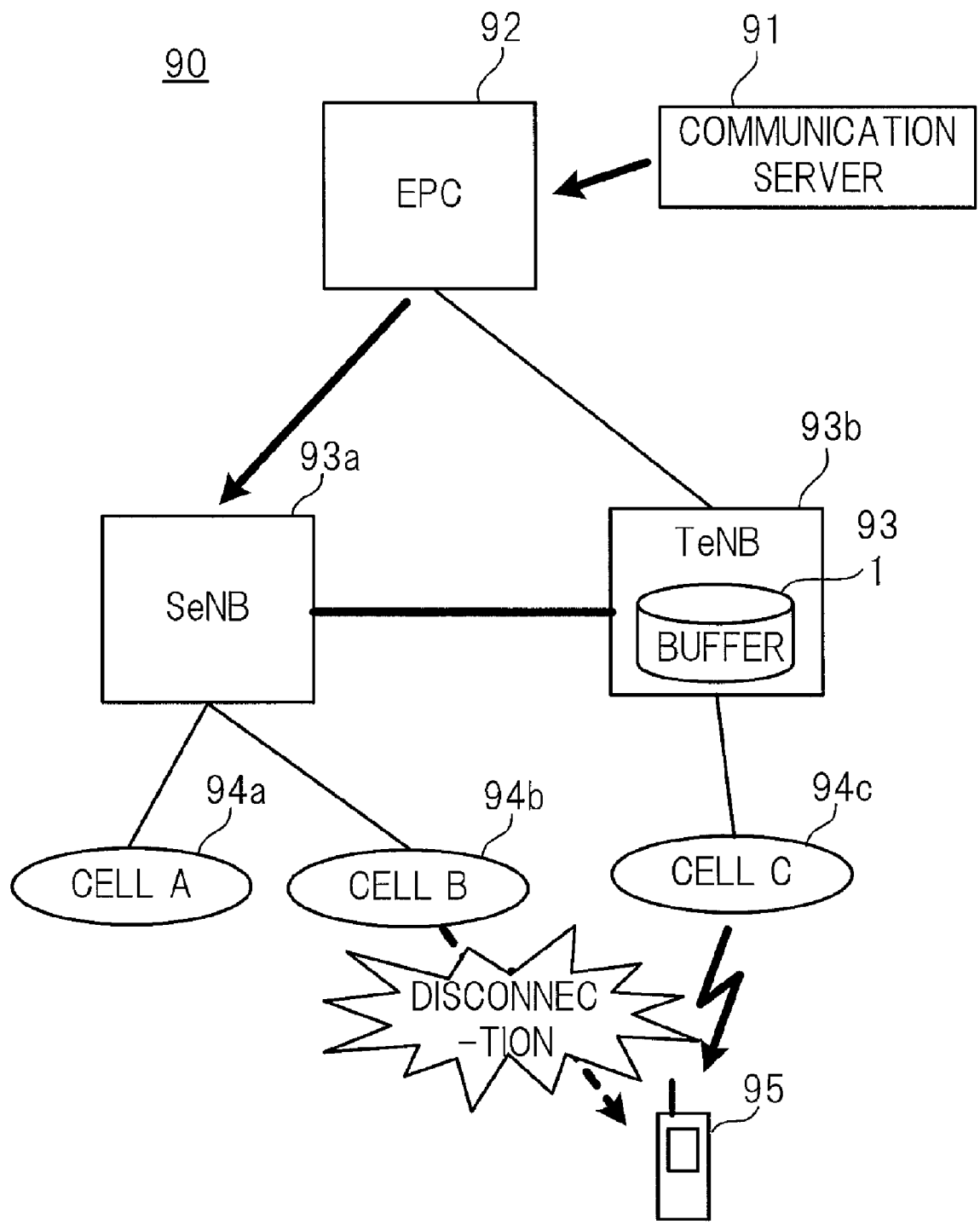
FIG. 2 is a block diagram to explain a state following FIG. 1.
Figure 3:
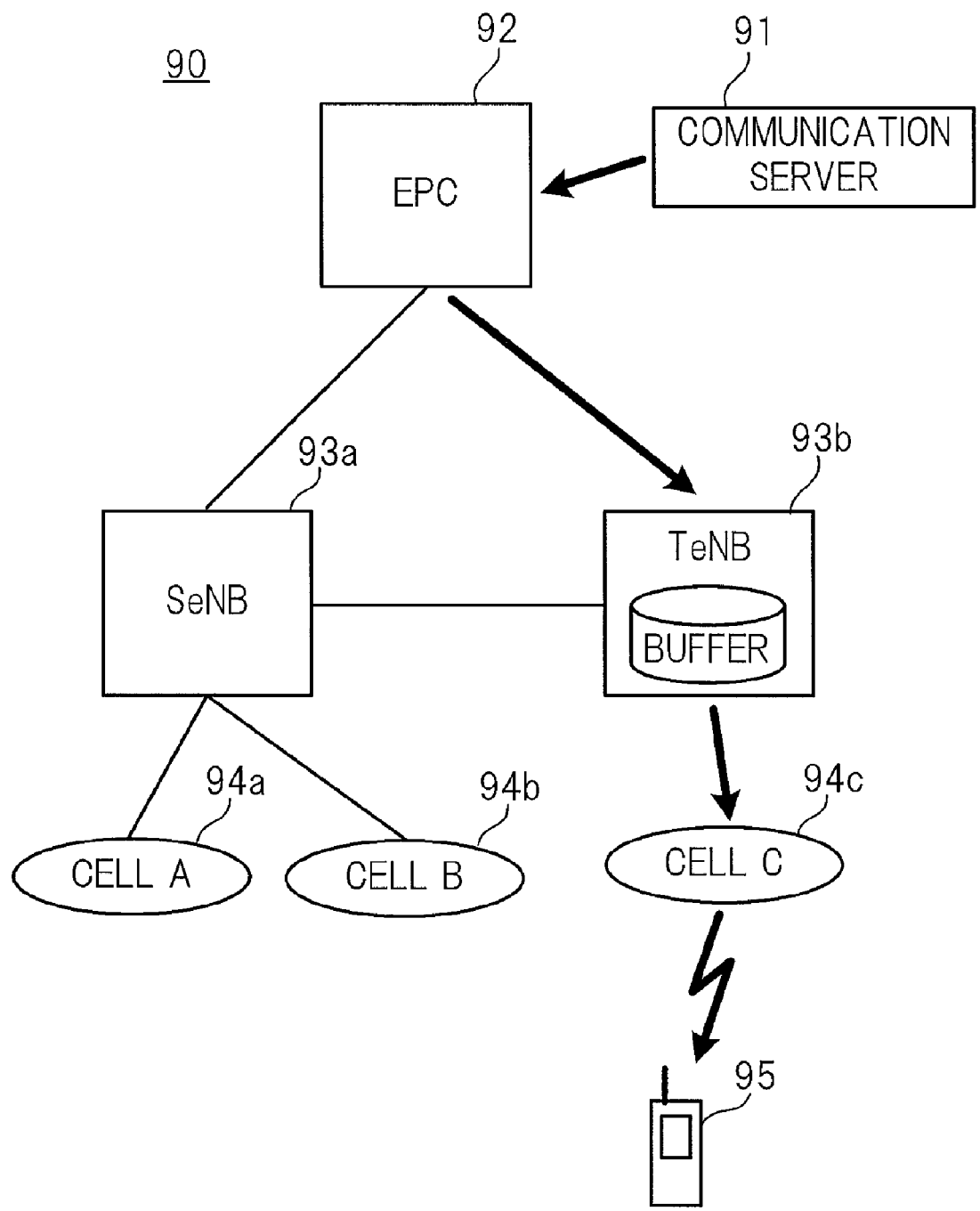
FIG. 3 is a block diagram to explain a state following FIG. 2.
Figure 4:
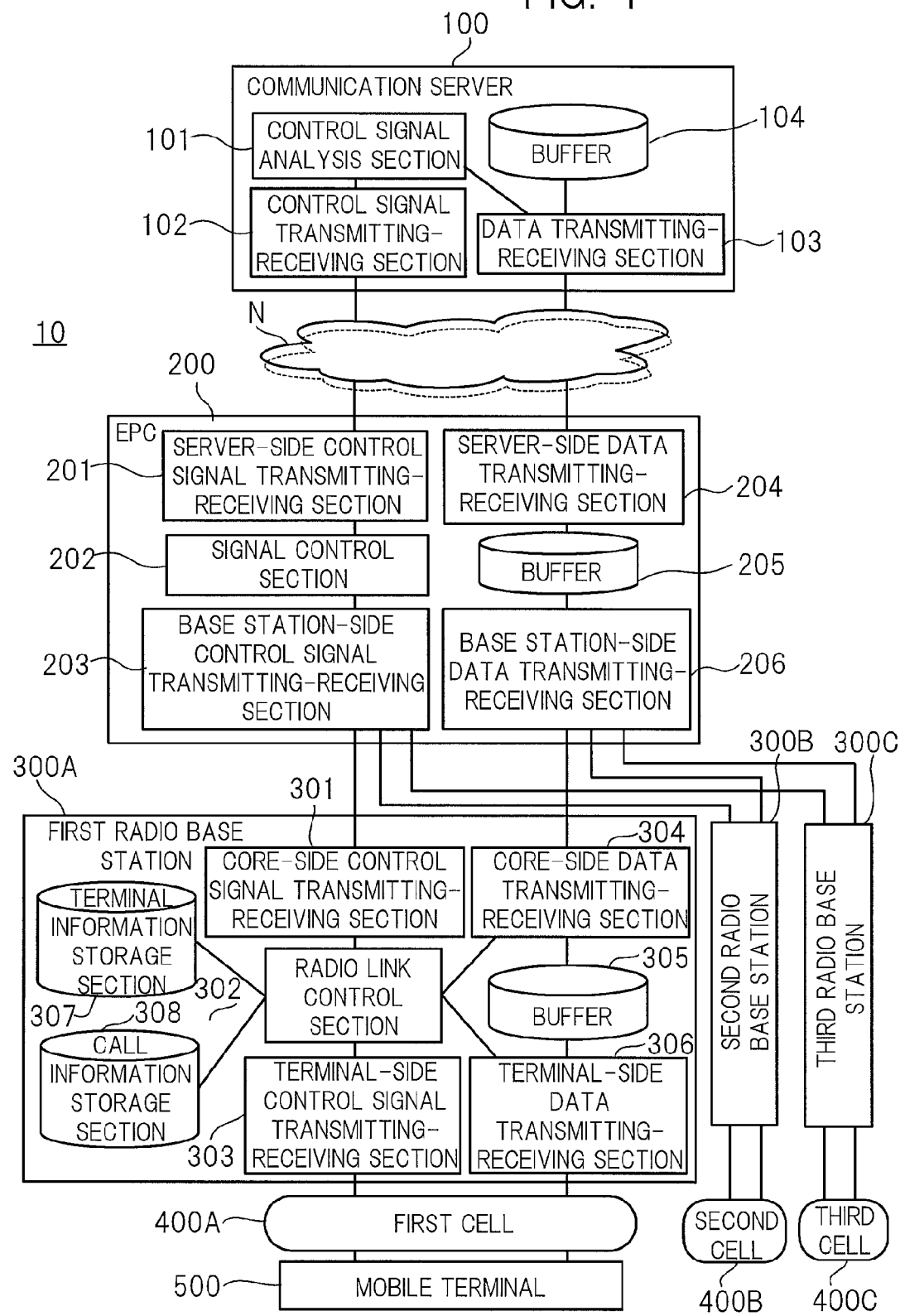
FIG. 4 is a block diagram illustrating a first embodiment of the communication system.

FIG. 4 is a block diagram illustrating a first embodiment of the communication system.

A communication system 10 illustrated in FIG. 4 includes a mobile terminal 500, a communication server 100 that distributes data toward the mobile terminal 500, plural radio base stations 300A, 300B, 300C that relay data to be distributed from the communication server 100 to the mobile terminal 500, and a Gateway 200 (hereafter, also referred to as EPC) that is connected to the communication server 100 via a network N and that distributes data into the radio base stations 300A, 300B and 300C. In the communication system 10, packet data (hereafter, referred to simply as data) is transmitted from the Gateway 200 to the mobile terminal 500 by a LTE communication method. Here, the radio base stations 300A, 300B, 300C correspond to an example of the base station in the above-described aspect.

The communication server 100 is a computer connected to the network N, and includes a buffer 104 in which data to be transmitted to the mobile terminal 500 is stored; a data transmitting-receiving section 103 to transmit and receive data to and from the network N; a control signal transmitting-receiving section 102 to transmit and receive control data to and from the network N; and a control signal analysis section 101 to analyze control data that is received in the control signal transmitting-receiving section 102. The data transmitting-receiving section 103 reads data stored in the buffer 104 and transmits the data toward the Gateway 200 via the network N. The control signal transmitting-receiving section 102 receives the control data from the Gateway 200 via the network N, and the control signal analysis section 101 causes the data transmitting-receiving section 103 to read and transmit the data according to the control data received in the control signal transmitting-receiving section 102. Further, the control signal analysis section 101 controls a transmission rate at which the data transmitting-receiving section 103 transmits the data according to the control data. The control data includes restriction instruction data and release instruction data. Here, the control data may also be called control information, the restriction instruction data may also be called restriction instruction information, and the release instruction data may also be called release instruction information. When the restriction instruction data is received, the control signal analysis section 101 restricts a transmission rate according to a parameter included in the restriction instruction data. When the release instruction data is received, the control signal analysis section 101 restores the restricted transmission rate to an original rate. After the restriction instruction data is received, if another restriction instruction data is received before the release instruction data is received and if parameters of the both restriction instruction data are the same, the control signal analysis section 101 does not change the transmission rate.

The network N includes a packet exchange network and the Internet.

The gateway 200 includes a server-side control signal transmitting-receiving section 201, a signal control section 202, a base station-side control signal transmitting-receiving section 203, a server-side data transmitting-receiving section 204, a buffer 205, and a base station-side data transmitting section 206.

The server-side data transmitting-receiving section 204 receives the data from the communication server 100 via the network N. The buffer 205 buffers the data received in the server-side data transmitting-receiving section 204. The base station-side data transmitting section 206 reads the data buffered in the buffer 205 and transmits it to one of the radio base stations 300A, 300B, and 300C. Incidentally, when the mobile terminal 500 transmits the data, namely, in the case of uplink direction communication, the base station-side data transmitting section 206 receives the data from the radio base stations 300A, 300B, and 300C; the buffer 205 buffers the data received in the base station-side data transmitting section 206; and the server-side data transmitting-receiving section 204 transmits the data buffered in the buffer 205 to the communication server 100 via the network N.

The base station-side control signal transmitting-receiving section 203 receives control data from the radio base station 300A, 300B, and 300C. The signal control section 202 controls each section of the Gateway 200 according to a signal received by the base station-side control signal transmitting-receiving section 203. The server-side control signal transmitting-receiving section 201 transmits a part of the signal generated in the signal control section 202 and the signal that is received in the base station-side control signal transmitting-receiving section 203 and provided to the signal control section 202, to the communication server via the network N.

The radio base stations 300A, 300B, and 300C are referred to as NodeB or eNB. The radio base stations 300A, 300B, and 300C have a same configuration one another, and at one time, one of them is responsible for relaying data to be distributed to the mobile terminal 500. The configuration of the first radio base station 300A, the second radio base station 300B and the third radio base station 300C will be explained by taking the first radio base station 300A as a representative.

The first radio base station 300A includes a core-side control signal transmitting-receiving section 301, a radio link control section 302, a terminal-side control signal transmitting-receiving section 303, a core-side data transmitting-receiving section 304, a buffer 305, a terminal-side data transmitting-receiving section 306, a terminal information storage section 307, and a call information storage section 308.

The core-side data transmitting-receiving section 304 receives data transmitted from the communication server 100 via the Gateway 200, and the buffer 305 buffers the data received by the core-side data transmitting-receiving section 304. The terminal-side data transmitting-receiving section 306 transmits by radio the data buffered in the buffer 305 to the mobile terminal 500 located in a first cell 400. When the mobile terminal 500 transmits the data, in other words, in the case of uplink direction communication, the terminal-side data transmitting-receiving section 306 receives the data from the mobile terminal 500, the buffer 305 buffers the data received in the terminal-side data transmitting-receiving section 306, and the core-side data transmitting-receiving section 304 transmits the data buffered in the buffer 305 to the Gateway 200.

The terminal-side control signal transmitting-receiving section 303 transmits and receives a control signal by radio to and from the mobile terminal 500 located in the first cell 400. The core-side control signal transmitting-receiving section 301 transmits and receives the control data to and from the Gateway 200. The radio link control section 302 analyzes the control signal from the mobile terminal 500 received in the terminal-side control signal transmitting-receiving section 303 while communicating with the terminal-side control signal transmitting-receiving section of another radio base station 300B. The terminal-side control signal transmitting-receiving section 303 monitors a radio link state between the mobile terminal 500 and the radio base station 300A, namely, a connection state by radio, and detects an occurrence of handover, and also exchanges control data with the Gateway 200 and the communication server 100 via the core-side control signal transmitting-receiving section 301. Furthermore, the terminal-side control signal transmitting-receiving section 303 controls the core-side data transmitting-receiving section 304 and the terminal-side data transmitting-receiving section 306 so that the core-side data transmitting-receiving section 304 and the terminal-side data transmitting-receiving section 306 transmit and receive data.

In more detail, when detecting a handover occurrence by the control signal of the mobile terminal 500, the radio link control section 302 transmits restriction control data toward the communication server 100 according to a type of service to which the data to be relayed belongs, and then, when the radio link control section 302 receives restriction response data from the communication server 100, the radio link control section 302 performs handover processing and causes another base station to take over the responsibility of relaying. Also, when the first radio base station 300A takes over the responsibility of relaying from another radio base station, the radio link control section 302 transmits, toward the communication server 100, release instruction data to release the restriction of a data transmission rate, and receives a release response signal from the communication server 100. During the handover, if the amount of data stored in the buffer 305 exceeds a predetermined criterion, the radio link control section 302 transmits, toward the communication server 100, restriction instruction data to further restrict the data transmission rate.

The terminal information storage section 307 holds terminal information that is information of a mobile terminal of which data the radio base station 300A is responsible for relaying, and the call information storage section 308 holds call information that is call information of which data the radio base station 300A is responsible for relaying. One mobile terminal for which the radio base station 300A is responsible responds to one call, and according to a state of communication, plural mobile terminals respond to one call. The terminal information and the call information are read by the radio link control section 302, and used to determine a type of service the data belongs to.

Figure 5:
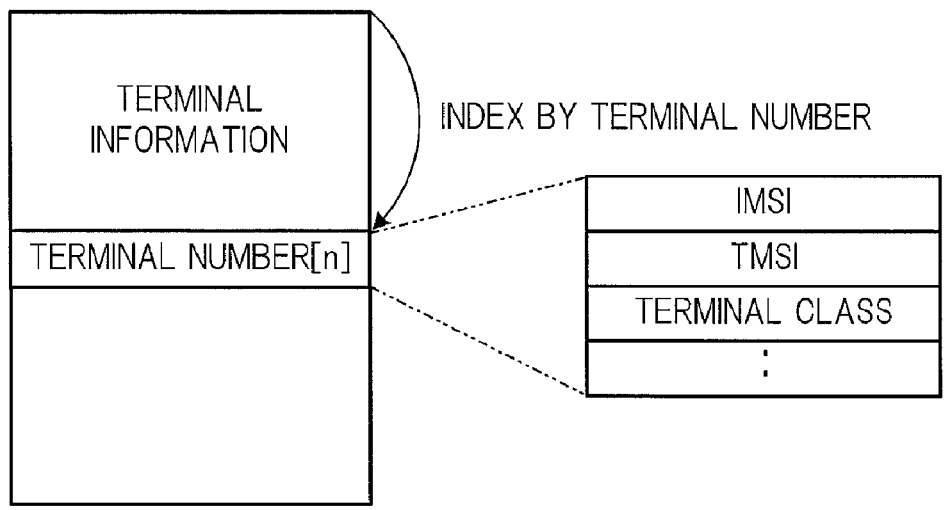
FIG. 5 is a diagram illustrating a structure of terminal information stored in a terminal information storage section of a radio base station.
Figure 6:
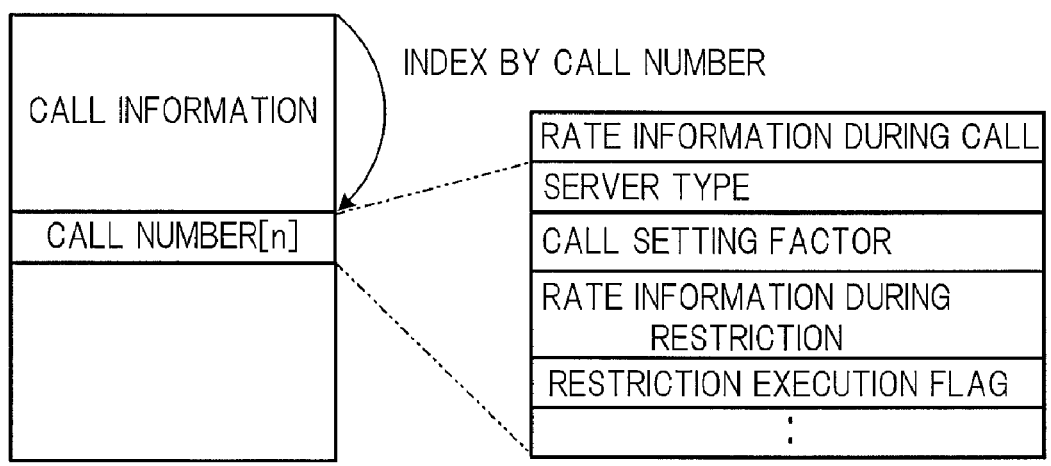
FIG. 6 is a diagram illustrating a structure of call information stored in a call information storage section 308.

FIG. 5 illustrates a structure of terminal information stored in the terminal information storage section 307 of the radio base station 300A, and FIG. 6 illustrates a structure of call information stored in the call information storage section 308.

The terminal information illustrated in FIG. 5 is made such that pieces of information of each mobile terminal which are obtained from the mobile terminal 500 or the Gateway 200 which is a higher-level node are integrated, at the time of connecting a call, namely, when the communication is started. The call information illustrated in FIG. 6 is made such that pieces of information of each call are integrated. The terminal information is indexed by an ID number assigned to every mobile terminal to be held. The information of one mobile terminal includes; International Mobile Subscriber Identity (IMSI) in conformity with ITU-T Recommendation E. 212, Temporary Mobile Subscriber Identity (TMSI) that is temporarily assigned for a connection and a terminal class representing either one of a general user terminal and a flat-rate user terminal.

The call information is indexed by an ID number assigned to each call to be held. The information of one call includes a piece of rate information during call, a service type, a call setting factor, a piece of rate information during restriction and a restriction execution flag. The rate information during call represents a normal transmission rate when rate is not restricted, and represents either of communication rates of 384 Kbps uplink/384 Kbps downlink, 1 Mbps uplink/1 Mbps downlink, and 50 Mbps uplink/300 Mbps downlink. The service type represents a type of service being carried out, namely, a type of service to which the data in communication belongs, and represents either one of TV-phone, Internet communication and file receiving. The call setting factor is set with a setting factor of call and represents either one of incoming and originating. The rate information during restriction represents a transmission rate when a data transmission rate is restricted, and in addition to the 384 Kbps uplink/384 Kbps downlink, 1 Mbps uplink/1 Mbps downlink, 50 Mbps uplink/300 Mbps downlink, represents a transmission rate indicating 50% or 80% slowdown of transmission rate, and further, a communication rate of 0 Kbps uplink/0 Kbps downlink. The restriction execution flag represents whether or not restriction of a data transmission rate is performed.

Hereafter, explanation will be made about each section of the second radio base station 300B and the third radio base station 300C having the same configuration as the first radio base station 300A by using same numerals as those of the each section in the first radio base station 300A while omitting illustration.

There are, in communicating data, downlink direction communication where data is directed to the mobile terminal 500 and, in reverse, uplink direction communication where data is transmitted from the mobile terminal 500. Hereafter, explanation is mainly made about the downlink direction communication to which features of the present embodiment pertain.

Figure 9:
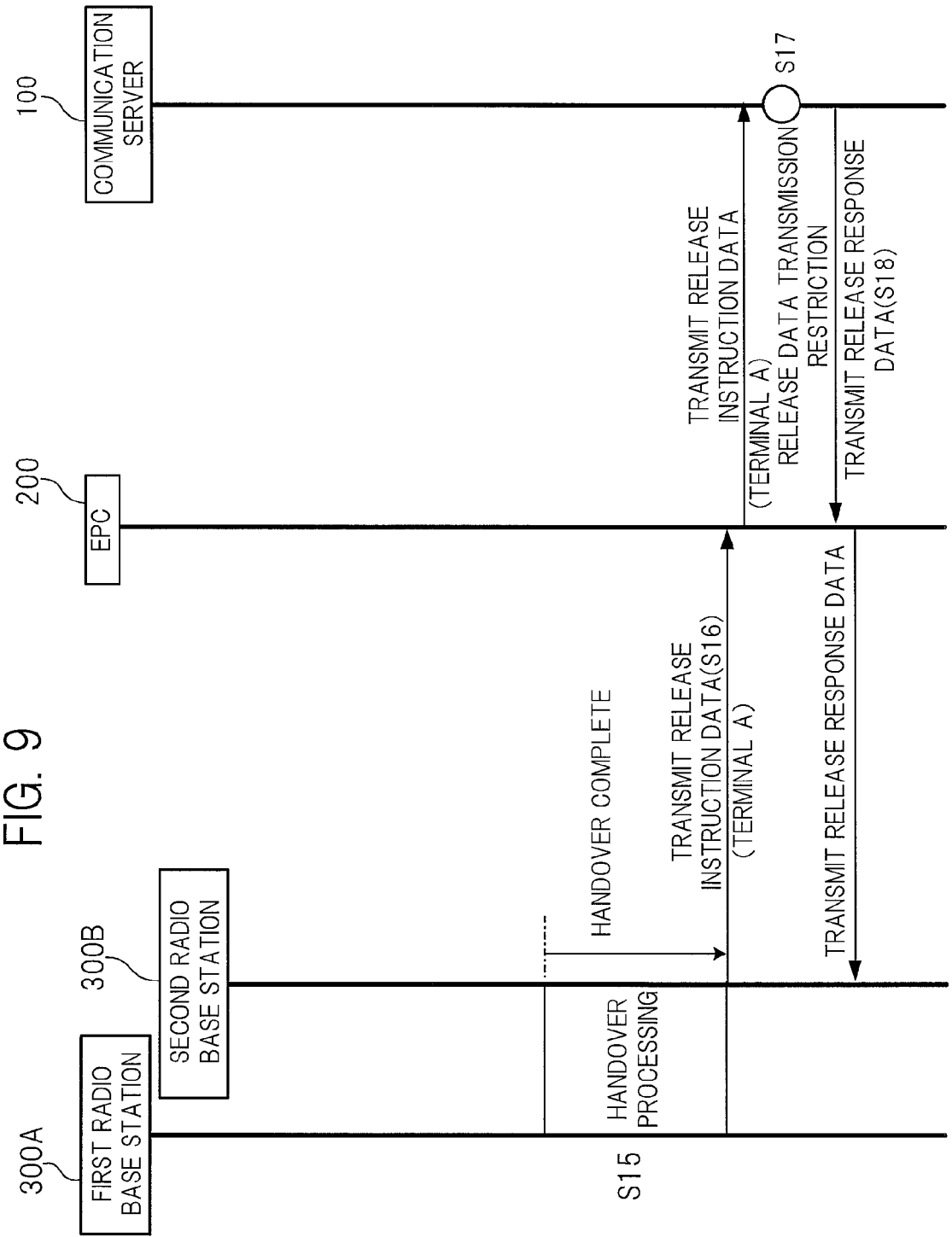
FIG. 9 is a flowchart illustrating processes following the processes in FIG. 7.

FIG. 7 is a flowchart illustrating processes at the time of handover in the communication system illustrated in FIG. 4, and FIG. 9 is a flowchart illustrating processes subsequent to the processes in FIG. 7. The flowcharts illustrated in FIG. 7 and FIG. 9 indicate processes when the first mobile terminal 500 illustrated in FIG. 4 moves to the second cell 400B in a state where the first radio base station 300A illustrated in FIG. 4 is responsible for relaying data for the mobile terminal 500 located in the first cell 400A.

Firstly, in a handover detection step S11, when the mobile terminal 500 moves to the second cell 400B for which the second radio base station 300B is responsible, from the first radio base station 300A for which the first radio base station 300A is responsible, the first radio base station 300A communicating with the mobile terminal 500 detects a handover occurrence. In more detail, the radio link control section 302 of the first radio base station 300A receives a handover request to the cell 400B from the mobile terminal 500 via the terminal-side control signal transmitting-receiving section 303, thereby detecting the handover occurrence. Hereafter, the moving mobile terminal 500 is also called as a terminal A.

When the first radio base station 300A detects the handover occurrence (S11), in the next restriction instruction transmission step (S12), if a service to which the data belongs is a type to be restricted on rate, the first radio base station 300A transmits a restriction instruction to restrict data transmission rate toward the communication server 100. In more detail, the radio link control section 302 transmits restriction instruction data to the Gateway 200 via the core-side control signal transmitting-receiving section 301. Parameters indicating slowdown 50% of the transmission rate restriction, the terminal A are included in the restriction instruction data for the example illustrated in FIG. 7. When the signal control section 202 of the Gateway 200 receives the restriction instruction data via the base station side-control signal transmitting-receiving section 203, the signal control section 202 transmits this restriction instruction data toward the communication server 100 via the server-side control signal transmitting-receiving section 201. The restriction instruction data is received by the communication server 100. Additionally, details of determining a service to which the data belongs will be described later.

Next, in a rate restriction step (S13), the communication server 100 restricts the transmission rate of data. In more detail, when the control signal analysis section 101 of the communication server 100 receives the restriction instruction data via the control signal transmitting-receiving section 102, the communication server 100 causes the data transmitting-receiving section 103 to reduce 50% of the transmission rate of data for the terminal A which data is read from the buffer 104. In this way, the transmission rate of data to be transmitted from the communication server 100 toward the terminal A is restricted according to the restriction instruction data.

In the next restriction response transmission step (S14), the communication server 100 transmits restriction response data as a response to the restriction instruction data, toward the first radio base station 300A. In more detail, the control signal analysis section 101 that has caused the transmission rate of data to be restricted transmits the restriction response data toward the Gateway 200 via the control signal transmitting-receiving section 102. The Gateway 200 transmits the received restriction response data to the first radio base station 300A.

Next, in a handover step (S15), the first radio base station 300A causes the second base station 300B to take over responsibility of relaying.

Figure 8B:
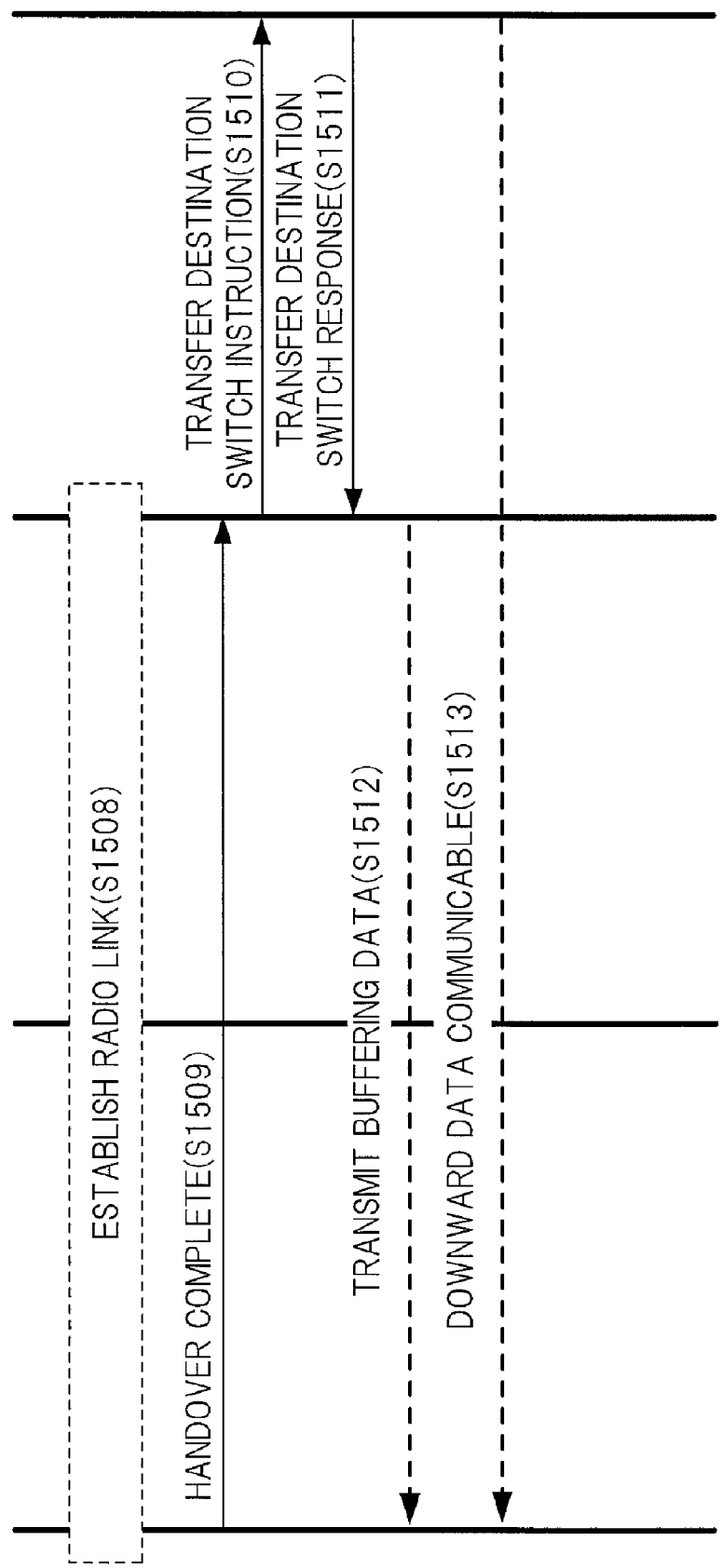

FIGS. 8A, 8B are flowcharts illustrating details of the handover step illustrated in FIG. 7. Processes of the handover step per se are mainly related to the processes associated with the mobile terminal 500 rather than the processes in the communication server 100, so that in FIGS. 8A and 8B, the mobile terminal 500 is illustrated and the communication server is omitted.

In the handover step illustrated in FIGS. 8A and 8B, firstly, the first radio base station 300A, for example, the radio link control section 302 requests a handover of the second radio base station 300B (S1501). Additionally, the terminal information and the call information illustrated in FIG. 5 and FIG. 6 are also transmitted to the second base station 300B from the first radio base station 300A. The second radio base station 300B, upon receiving the handover request, makes a radio resource reservation (S1502) to establish a radio link per se with the mobile terminal 500 and transmits a handover response to the first radio base station 300A (S1503). The first radio base station 300A having received the handover response from the second radio base station 300B gives a handover instruction to the mobile terminal 500 (S1504). With this, the radio link between the mobile terminal 500 and the first radio base station 300A is disconnected. Thereafter, until when a radio link between the mobile terminal 500 and the second radio base station 300B is established (S1508), the data transmitted from the mobile terminal 500 toward the Gateway 200 is buffered in the second radio base station 300B. In more detail, although the data is transmitted to the first radio base station 300A from the Gateway 200, the first radio base station 300A transfers this data to the second radio base station 300B. The second radio base station 300B buffers the transferred data.

After that, when the radio link is established between the mobile terminal 500 and the second radio base station 300B (S1508), the mobile terminal 500 notifies the second radio base station 300B of the handover completion (S1509). When the handover completion is notified, the second radio base station 300B transmits a transfer destination switch instruction of the data to the Gateway 200 (S1510). The Gateway 200 transmits a transfer destination switch response to the Gateway 200 (S1511). With this, the switchover of the radio link is completed. The second radio base station 300B transmits the buffered data up to that time to the mobile terminal 500 (S1512). Following the buffered data, the data to be transmitted from the Gateway 200 is also transmitted to the mobile terminal 500 via the second radio base station 300B (S1513). In this way, the handover is completed, and downlink data directed to the mobile terminal 500 from the communication server 100 again starts communicating.

Next, processes after the handover completion will be explained with reference to FIG. 9.

After the completion of the handover step (S15), the second radio base station 300B transmits release instruction data to release the restriction of the data transmission rate, toward the communication server 100 in the release instruction transmission step (S16). In more detail, the radio link control section 302 of the second radio base station 300B transmits the release instruction data to the Gateway 200 via the core-side control signal transmitting-receiving section 301. The signal control section 202 of the Gateway 200 transmits the release instruction data having received by the base station-side control signal transmitting-receiving section 203 toward the communication server 100 via the server-side control signal transmitting-receiving section 201. The release instruction data is received by the control signal transmitting-receiving section 102 of the communication server 100.

Next, in a data transmission restriction release step (S17), the control signal analysis section 101 of the communication server 100 causes the data transmitting-receiving section 103 to release, in accordance with the release instruction data having received by the control signal transmitting-receiving section 102, the slowdown of the transmission rate of the data for the terminal A which data is read from the buffer 104. In this way, the data is transmitted at a normal transmission rate toward the terminal A from the communication server 100.

In the following release response data transmission step (S18), the control signal analysis section 101 that has caused the restriction of the data transmission rate to be restricted transmits restriction response data toward the Gateway 200 via the control signal transmitting-receiving section 102 as a response for the release instruction data. The second radio base station 300B recognizes that the transmission rate of data returns to normal by receiving the restriction response data.

In this way, a series of the processes at the time of handover completes. Since the processing of handover step is a commonly known technology, its detailed explanation is omitted. In the communication system 10, a restriction instruction of a data transmission rate is transmitted upon detection of a handover occurrence, and the handover step is performed in a state where the data transmission rate is restricted. Therefore, the amount of data buffered in the second base station 300B is reduced to 50%, so that it is possible to reduce the capacity of a buffer while avoiding data loss.

In the above-described restriction instruction transmission step (S12), it is explained that the restriction instruction data is transmitted when the service to which the data belongs is a type to be restricted on rate restriction. Here, explanation will be made about determination of a type of service to which the data belongs.

Figure 10:
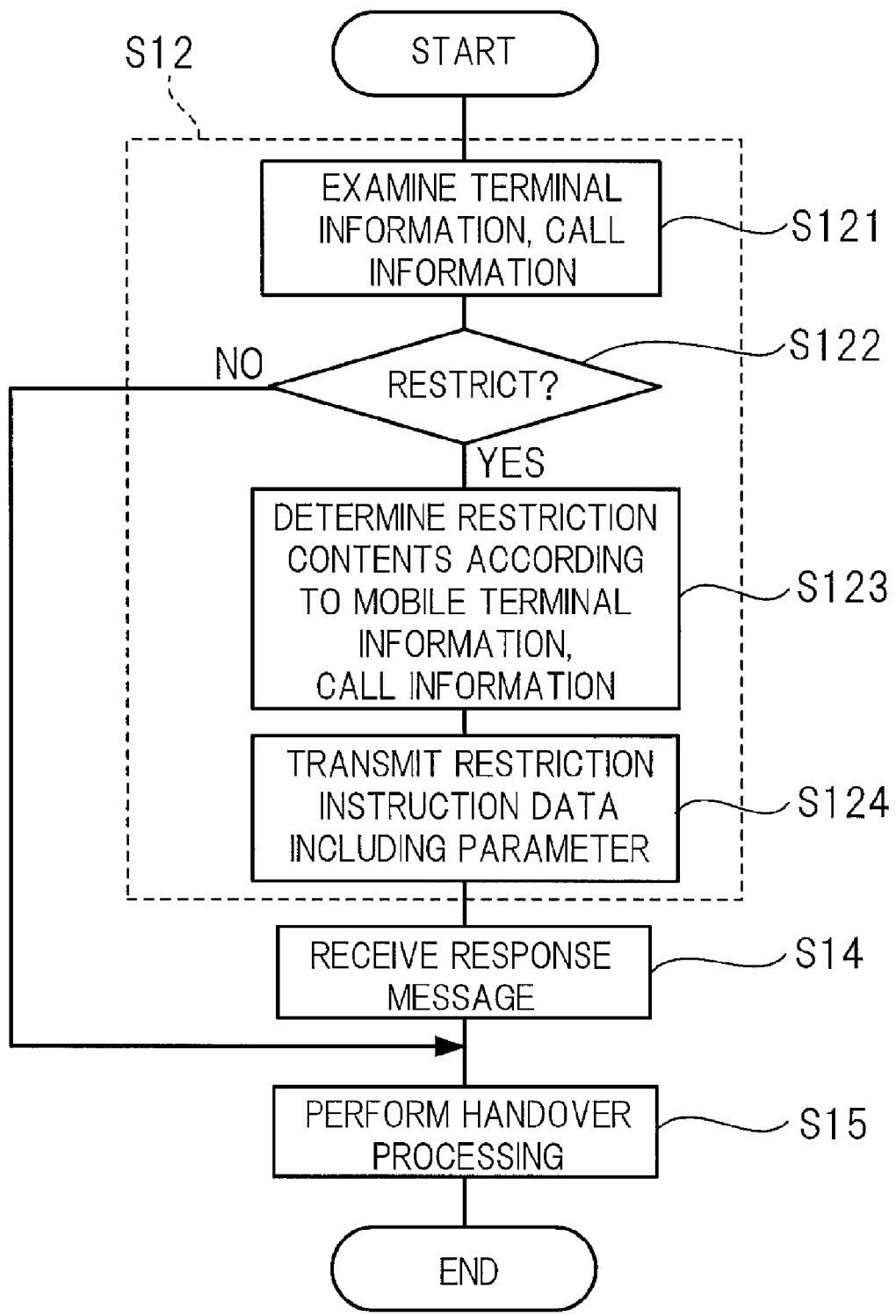
FIG. 10 is a flowchart illustrating processes in a radio link control section of a first radio base station, among the processes illustrated in FIG. 7.

FIG. 10 is a flowchart illustrating processes in the radio link control section of the first radio base station, among the processes illustrated in FIG. 7. In FIG. 10, details of the restriction instruction transmission step are illustrated along with other steps.

Firstly, in the restriction instruction transmission step S12 illustrated in FIG. 10, the terminal information and the call information are examined (S121). For example, the radio link control section 302 reads the terminal information of the terminal A that is a target of the handover and the call information of the terminal A, among the terminal information (see FIG. 5) and the call information (see FIG. 6) stored in the terminal information storage section 307 and the call information storage section 308, and determines whether or not it is to be restricted on rate (S122). For example, when the service type of the call information represents "TV-phone" and when a terminal class of the terminal information represents "general user", the handover processing is carried out while omitting transmission of the restriction instruction data ("No" in S122). Other than that, the restriction instruction data is transmitted ("Yes" in S122).

The data belonging to the "TV-phone" is real-time data that becomes difficult to be displayed in a mobile terminal on the receiving-side if a transmission rate of the data is restricted. In this case, although it is not possible to reduce a buffering capacity at the time of handover in the targeted terminal A, it is possible to prevent a situation in which the data is ultimately unusable. Additionally, since the data belonging to the service of "general user" is expected to be transmitted without lowering the transmission rate, it is not possible to reduce the buffering capacity, however, a normal transmission rate is maintained. When a type of service to which the data belongs falls in neither of the "TV telephone" nor the "general user", the transmission rate is restricted. In other words, contents of restriction are determined according to the terminal information and call information (S123). For example, the higher the transmission rate indicated by the rate information during call is, the more the ratio of slowdown is increased. And restriction instruction data including a parameter to indicate the determined restriction contents is transmitted (S124). Thereafter, the radio link control section 302 receives a response message as explained in FIG. 7 (S14) and performs the handover processing (S15).

Up to this, explanation is made about the processes when one handover occurs. Hereafter, explanation will be made about processes when a handover again occurs before the release instruction data is transmitted.

Figure 11B:
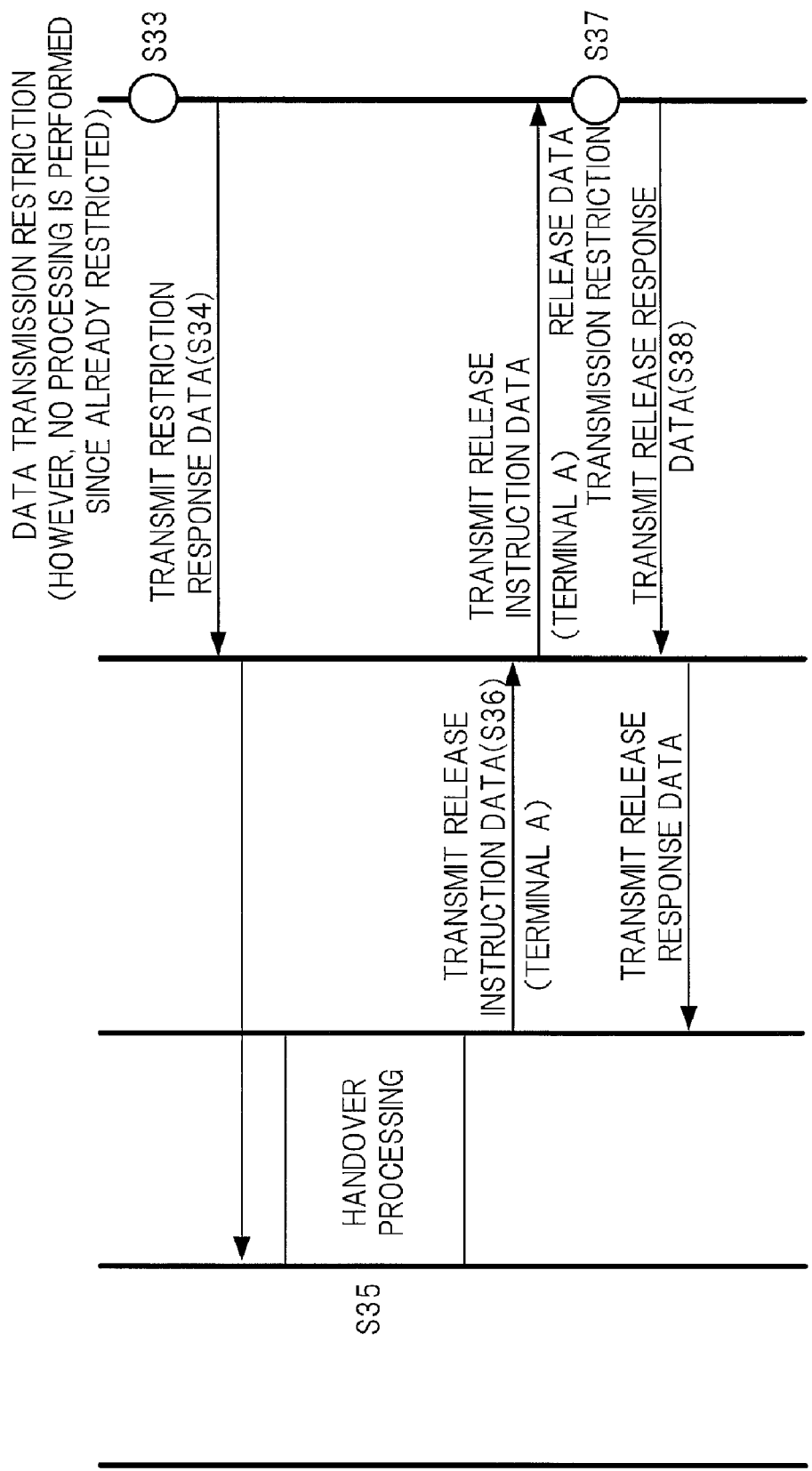

FIGS. 11A, 11B are flowcharts illustrating processes at the time of consecutive handover occurrences. In FIGS. 11A, 11B, the third radio base station 300C is also illustrated.

Among the processes illustrated in FIGS. 11A, 11B, the processes from the detection of a handover occurrence (S11) from the first radio base station 300A to the second radio base station 300B until when the handover step is started (S15) are the same as the processes described in FIG. 7. Here, before transmitting the release instruction data, the mobile terminal further moves, and an occurrence of handover from the second radio base station 300B to the third radio base station 300C is detected (S32). In this case, the second radio base station 300B transmits restriction instruction data toward the communication server 100 (S32). Parameters included in the restriction instruction data are the same as those of the restriction instruction data in the previous step S12, since the handover target is the same terminal A as the previous one. Because of this, in the rate restriction step (S13), the state of restriction does not change. However, after that, in the restriction response data transmission step (S14), the communication server 100 transmits the restriction response data toward the second radio base station 300B. The second radio base station 300B having received the restriction response data causes the third base station 300C to take over responsibility of relaying.

After a handover step (S35) is completed, in a release instruction transmission step (S36), the third radio base station 300C transmits release instruction data to release the restriction of the data transmission rate toward the communication server 100. In response to this, the communication server 100 releases the restriction of the data transmission rate (S37). Also, the communication server 100 transmits release response data to the third radio base station 300C (S38).

The radio base station that takes over responsibility of relaying by the handover buffers data in an internal buffer. Subsequently, explanation will be made about a case in which the amount of data stored in the buffer exceeds a predetermined criterion for some reason.

Figure 12B:
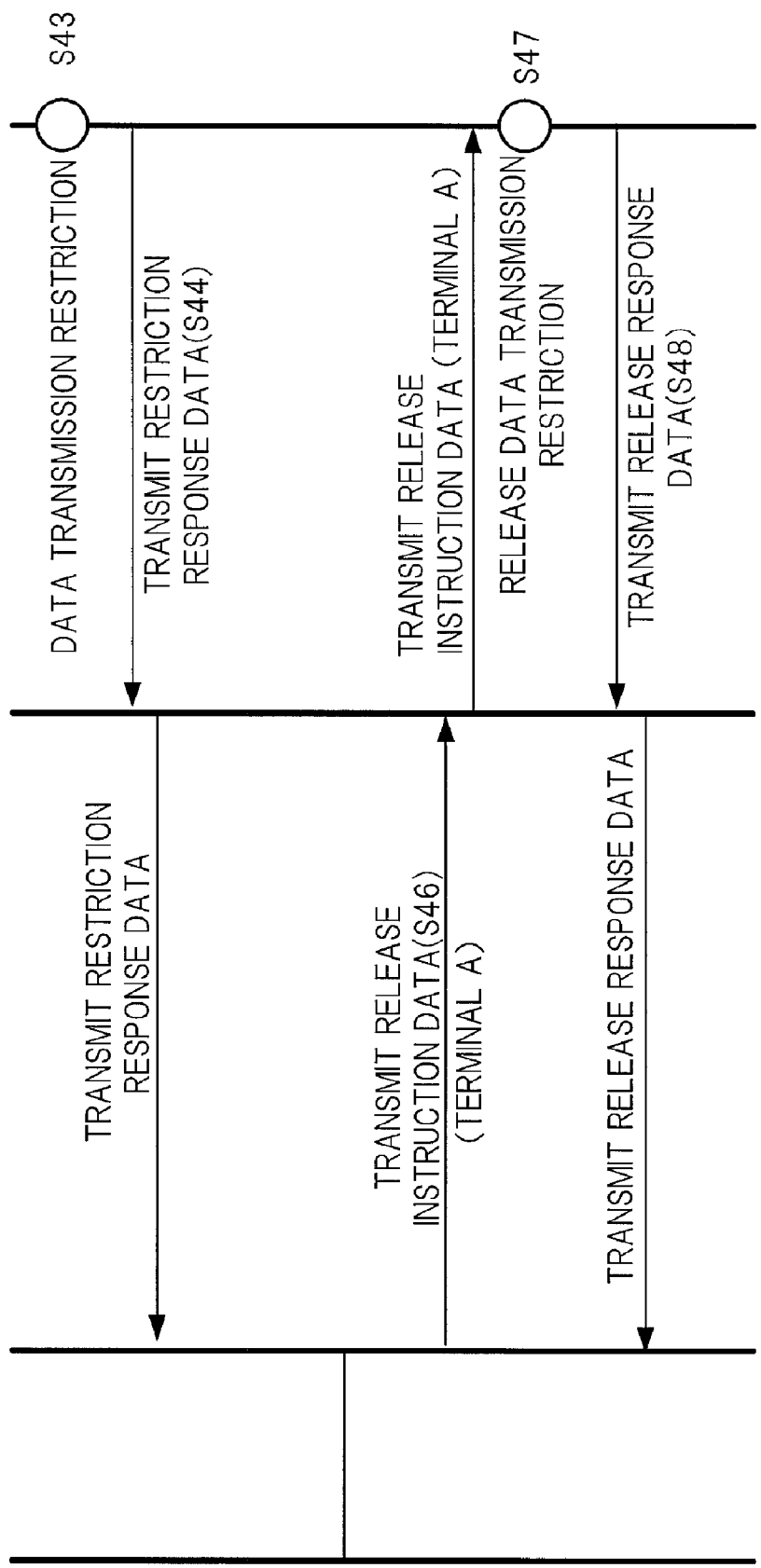

FIGS. 12A, 12B are flowcharts illustrating processes accompanying re-restriction.

Among the processes illustrated in FIGS. 12A, 12B, the processes illustrated in step S12 through S14 are the same as those explained in FIG. 7. In the handover step (S15) subsequent to this step, the second radio base station 300B taking over responsibility of relaying buffers the data in the buffer 305. However, since it takes time to perform the handover processing, there is a case in which the amount of data stored in the buffer 305 exceeds a particular ratio, for example, 80% of the capacity allocated to the terminal A. In this case, in a re-restriction instruction transmission step S42, the second radio base station 300B transmits restriction instruction data to further restrict a data transmission rate toward the communication server. For example, the radio link control section 302 of the second radio base station 300B transmits restriction instruction data including a parameter indicating, for example, 80% slowdown, which is a greater slowdown than the restriction instruction data in the previous step S12. The communication server having received this restriction instruction data reduces the transmission rate of data by 80%. With this, the amount of data to be buffered is controlled so as not to exceed the capacity of the buffer 305.

Thereafter, the communication server 100 transmits restriction response data to the second radio base station 300B (S44). The subsequent steps S46 and S47 in FIG. 12B are similar to the steps S16 and S17 explained in FIG. 9, and thus explanation is omitted.

Next, a second embodiment will be explained. It the explanation of the second embodiment, same numerals are given to the same elements as each element in the embodiment so far explained, and a point different from the previously described embodiment will be described.

Figure 13A:
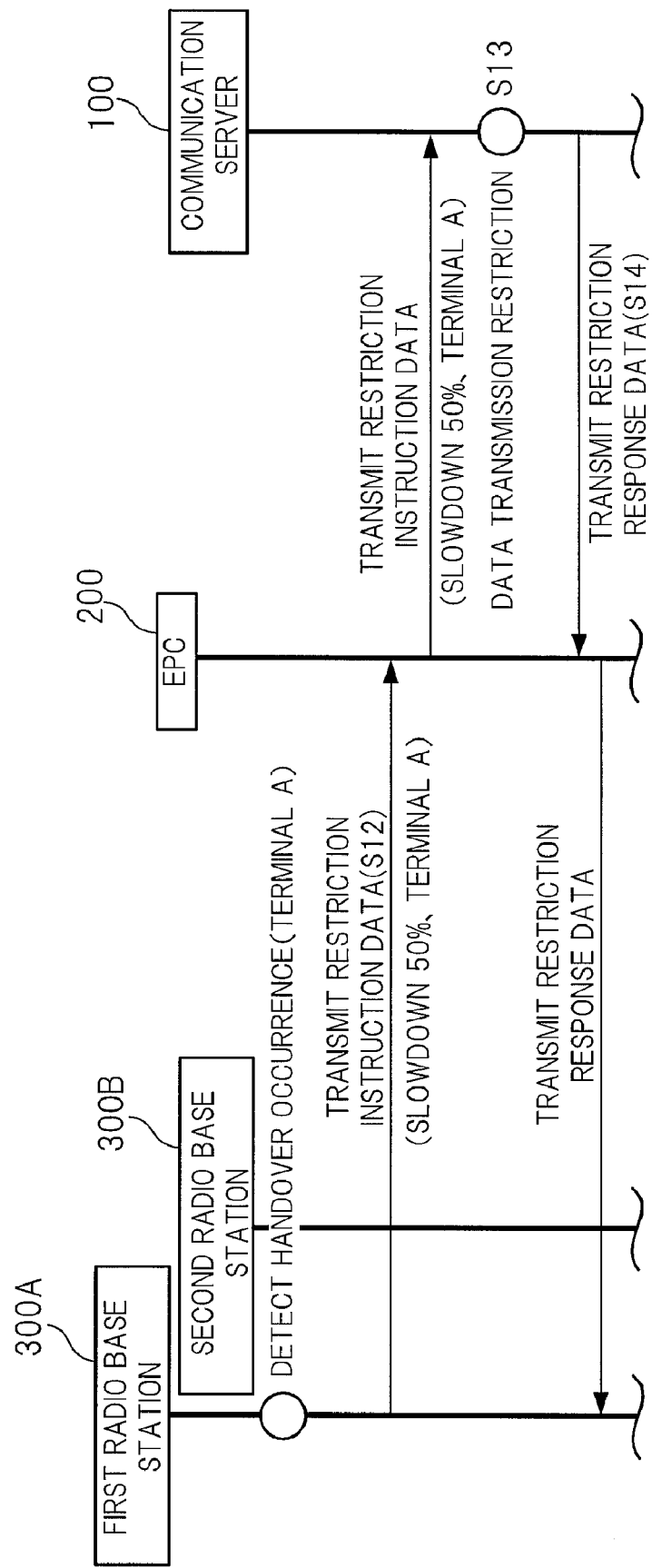
FIGS. 13A, 13B are flowcharts illustrating processes at the time of handover in a communication system in a second embodiment.
Figure 13B:
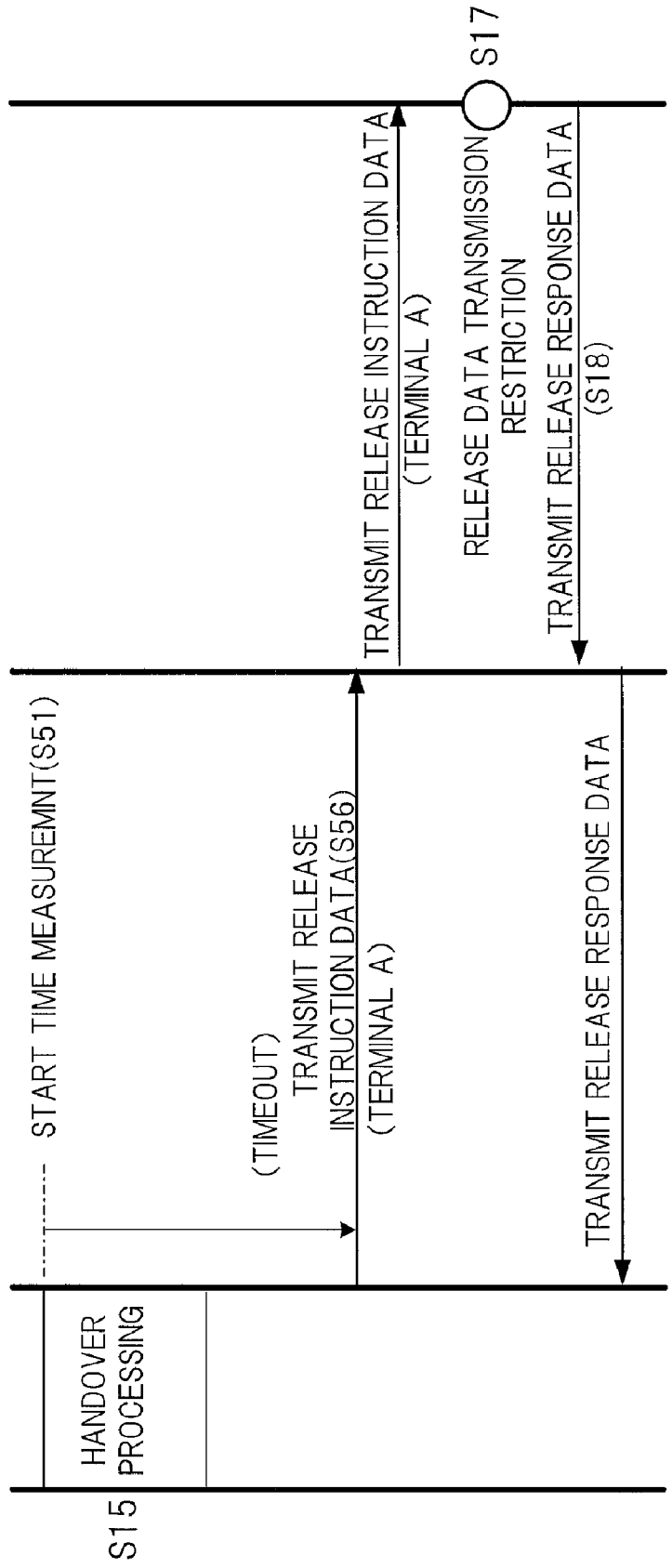

FIGS. 13A, 13B are flowcharts illustrating processes at the time of handover in a communication system of the second embodiment.

The communication system of the second embodiment is different from the first embodiment in that the release instruction data is transmitted after the radio base station 300 (300A, 300B) takes over the responsibility of relaying and furthermore, after a predetermined period has elapsed. For example, the radio link control section 302 of the radio base station 300 (300A, 300B) includes a timer and start measuring time of the predetermined period when the handover processing is started. Until this predetermined time elapses, even if the handover processing is completed, the release instruction data is not transmitted.

Explanation will be made along a flowchart of FIGS. 13A, 13B. Among the processes illustrated in FIGS. 13A, 13B, the processes illustrated in steps S12 through S15 are the same as those of the first embodiment explained in FIG. 7. However, in the processes of the second embodiment, the radio link control section 302 of the second radio base station 300B that takes over the responsibility of relaying in the handover step (S15) starts timer-measuring to measure a transmission timing of the release instruction data (S51). The radio link control section 302 of the second radio base station 300B does not transmit the release instruction data at a timing of taking over the responsibility of relaying, namely, at the timing when the handover processing is completed, but radio link control section 302 transmits the release instruction data at a timing of timeout, namely, at the timing when the timer-measuring is finished (S56). The processes of releasing the data transmission restriction (S17) and transmitting the restriction response data (S18), subsequent to this step are the same as those of the first embodiment explained in FIG. 9. As explained in FIGS. 13A, 13B, the release instruction data is transmitted after the radio link control section 302 of the second radio base station 300B takes over responsibility of relaying and furthermore, after a predetermined period has elapsed, so that it is possible to restrict frequent occurrences of restriction instruction and restriction release when the responsibility of relaying frequently moves from one base station to another.

Next, a third embodiment will be explained. In the following explanation of the third embodiment, the same elements as those in the previously described embodiments are indicated by the same numerals and the explanation will be made about a point different from the previous embodiments.

Figure 14B:
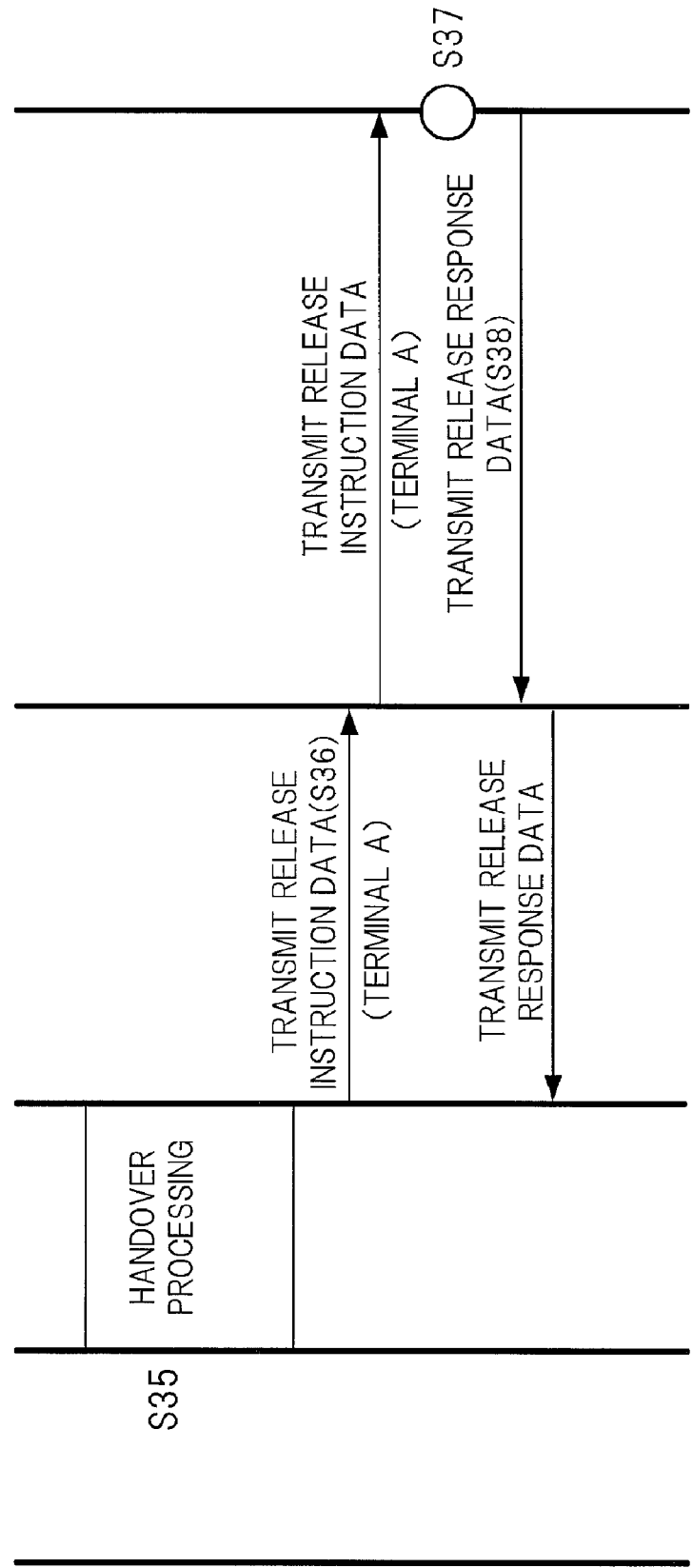

FIGS. 14A, 14B are flowcharts indicating processes when the responsibility of relaying moves from one base station to another in a communication system of the third embodiment. In FIGS. 14A, 14B, the third radio base station 300C is also illustrated.

The communication system of the third embodiment is different from the second embodiment in that the radio base station 300 (300A, 300B, 300C) also omits transmission of the restriction instruction data within a predetermined period after the radio base station 300 takes over the responsibility of relaying and further, causes another base station to take over the responsibility of relaying. For example, the radio link control section 302 of the radio base station 300 (300A, 300B, 300C) includes a timer and starts measuring time of the predetermined period with the start of the handover processing. Until this period elapses, even if a next handover occurrence is further detected, the restriction instruction data is not transmitted.

Explanation will be made following flowcharts of FIGS. 14A, 14B. Among the processes illustrated in FIGS. 14A, 14B, the processes of detecting an occurrence of a handover from the first radio base station 300A to the second radio base station 300B (S11) until the processes of starting the handover step (S15) are the same as those described in FIGS. 13A, 13B. In the processes of the third embodiment, the radio link control section 302 of the second radio base station 300B that takes over the responsibility of relaying in the handover step (S15) starts timer-measurement to measure a transmission timing of the release instruction data (S51).

Before the timeout, namely, the timer-measurement is finished, if the mobile terminal 500 further moves to the third cell 400C and an occurrence of handover is detected in the second radio base station 300B, the radio link control section 302 of the second radio base station 300B performs the handover processing (S35) without transmitting the restriction instruction data, and passes the responsibility of relaying to the third radio base station 300C. The radio link control section 302 of the third radio base station 300C further taking over the responsibility of relaying, after the handover step (S35) is completed, the radio link control section 302 transmits the release instruction data to release the restriction of the data transmission rate toward the communication server 100 in the release instruction transmission step (S36). Since the step S36 through the step S38 illustrated in FIG. 14B are similar to each step illustrated in FIG. 11B, explanation is omitted.

As illustrated in FIGS. 14A, 14B, even if the responsibility of relaying is taken over from the first radio base station 300A to the second radio base station 300B and further to the third radio base station 300C, the restriction of the data transmission rate needs to be done once, therefore it is possible to restrict frequent occurrences of restriction instruction and restriction release.

In addition, in the above-described handover processing (S35), the timer information indicating a remaining time until the predetermined period elapses is taken over from the radio link control section 302 of the second radio base station 300B to the radio link control section 302 of the third radio base station 300C. It is also possible to employ a procedure in which the radio link control section 302 of the third radio base station 300C further taking over the responsibility of relaying measures a remaining time indicated by the timer information that is taken over and transmits the release instruction data at the timing of timeout.

In the above-described explanation made for each embodiment, the communication server 100 configured of a computer connected to the network N is illustrated as one example of the communication server in the aspect explained in "SUMMARY", however, this communication server may be a mobile terminal other than the communication server 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A communication method in a communication system, wherein the communication system comprises:
    a mobile terminal;
    a communication server that distributes data to the mobile terminal; and
    a plurality of base stations that are capable of relaying the data, and one of the base stations among the plurality of base stations is responsible for relaying the data, and
    the communication method comprises:
        detecting a type of service to which the data being relayed by a first base station responsible for relaying the data among the plurality of base stations belongs;
        restriction-instruction-information-transmitting including transmitting, to the communication server, restriction instruction information to restrict a data transmission rate when the type of service detected by the detecting is a type of service of ability to be reproduced even due to reduction of a data speed, and omitting the transmitting of the restriction instruction information when the type of service is a type of service of inability to be reproduced due to reduction of a data speed; and
        hand-overing, by the first base station, causing a second base station different from the first base station to take over the responsibility of relaying, after the transmitting of the restriction instruction information.

2. The communication method according to claim 1, further comprising transmitting, by the second base station, after the second base station performs the hand-overing, release instruction information to release the restriction of the data transmission rate to the communication server.

3. The communication method according to claim 2, wherein the transmitting includes transmitting the release instruction information after the second base station takes over the responsibility of relaying and further after a predetermined period elapses.

4. The communication method according to claim 1, wherein
    each of the plurality of base stations comprises a buffer to store the data to be relayed, and
    the communication method further comprises transmitting the restriction instruction information to further restrict the data transmission rate to the communication server, by the second base station, if an amount of the data stored in the buffer exceeds a predetermined criterion.

5. A base station in a communication system which includes a mobile terminal and a communication server that distributes data to the mobile terminal, the base station being responsible for relaying the data, wherein
    the base station comprises:
    a relay control section that detects a type of service to which the data being relayed belongs, transmits restriction instruction information to restrict a data transmission rate to the communication server when the type of service is a type of service of ability to be reproduced even due to reduction of a data speed, omits the transmitting of the restriction instruction information when the type of service is a type of service of inability to be reproduced due to reduction of the data speed, and then causes another base station different from the base station to take over the responsibility of relaying.

6. The base station according to claim 5, wherein if the relay control section takes over the responsibility of relaying from another base station different from the base station, transmits release instruction information to release the restriction of the data transmission rate to the communication server.

7. The base station according to claim 5, wherein the relay control section transmits the release instruction information after the relay control section takes over the responsibility of relaying and further after a predetermined period elapses.

8. The base station according to claim 5, further comprising a buffer to store the data to be relayed, wherein
    the relay control section transmits the restriction instruction information to further restrict the data transmission rate to the communication server, if an amount of the data stored in the buffer exceeds a predetermined criterion.

9. A communication system, comprising:
    a mobile terminal;
    a communication server that distributes data to the mobile terminal;

a plurality of base stations that are capable of relaying the data, and one of the base stations among the plurality of base stations is responsible for relaying the data; and a relay control section that detects a type of service to which the data being relayed belongs, transmits restriction instruction information to restrict a data transmission rate to the communication server when the type of service is a type of service of ability to be reproduced even due to reduction of a data speed, omits the transmitting of the restriction instruction information when the type of service is a type of service of inability to be reproduced due to reduction of the data speed, and then causes another base station different from the base station to take over the responsibility of relaying.

* * * * *